United States Patent
Gorman et al.

[15] 3,692,898
[45] Sept. 19, 1972

[54] AQUEOUS MAGNESIUM HYDROXIDE SUSPENSIONS

[72] Inventors: William G. Gorman, East Greenbush; Erich Katz, Troy, both of N.Y.

[73] Assignee: Sterling Drug Inc., New York, N.Y.

[22] Filed: Nov. 5, 1970

[21] Appl. No.: 87,330

[52] U.S. Cl. ................................................424/158
[51] Int. Cl. ............................................A61k 27/00
[58] Field of Search..............................424/157, 158

[56] References Cited

UNITED STATES PATENTS 2,774,710  12/1956  Thompson et al. ........424/157
3,555,151  1/1971  Kaplan et al. ..............424/156

FOREIGN PATENTS OR APPLICATIONS 916,933  1/1963  Great Britain.............424/157
1,031,149  5/1966  Great Britain.............424/157
1,057,940  2/1967  Great Britain.............424/158

OTHER PUBLICATIONS

Chemical Abstracts Vol. 62 8933 (1965)

Primary Examiner—Albert T. Meyers
Assistant Examiner—Frederick E. Waddell
Attorney—Elmer J. Lawson, B. Woodrow Wyatt, Thomas L. Johnson, Robert K. Bair, William G. Webb, Frederik W. Stonner, Roger T. Wolff and Lynn T. Fletcher

[57] ABSTRACT

Improved milk of magnesia containing small quantities of a combination of agents, namely, xanthan gum and sodium carboxymethylcellulose.

3 Claims, No Drawings

AQUEOUS MAGNESIUM HYDROXIDE SUSPENSIONS

This invention relates to aqueous suspensions of magnesium hydroxide.

Although aqueous pharmaceutical suspensions of magnesium hydroxide, e.g., milk of magnesia, have been sold as antacids and laxatives for almost a century, these preparations over the years have had the disadvantages of lacking in both suspension stability and palatability.

It is an object of this invention, therefore, to provide an improved aqueous pharmaceutical suspension of magnesium hydroxide having improved particle stability, viscosity, homogeneity, suspension stability and palatability.

In accordance with the present invention, an improved aqueous pharmaceutical suspension of magnesium hydroxide having the improved properties as above has been achieved using small quantities of a unique combination of agents, namely, xanthan gum and sodium carboxymethylcellulose, neither of which alone is capable of yielding said improved suspension. The improved aqueous pharmaceutical suspension of the invention comprises from about 7 percent to about 8.5 percent by weight per weight of magnesium hydroxide, from about 0.1 percent to about 1.0 percent by weight per volume of xanthan gum and from about 0.05 percent to about 0.50 percent by weight per volume of sodium carboxymethylcellulose. Preferred embodiments are milk of magnesia preparations containing from about 0.40 percent to about 0.60 percent by weight per volume of xanthan gum and from about 0.10 percent to about 0.30 percent by weight per volume of sodium carboxymethylcellulose. A particularly preferred embodiment is milk of magnesia containing about 0.5 percent by weight per volume of xanthan gum and 0.2 percent by weight per volume of sodium carboxymethylcellulose. In contrast, milk of magnesia containing 0.5 percent wt./vol. of xanthan gum but no sodium carboxymethylcellulose, although resulting in a reasonably satisfactory coating of the magnesium hydroxide particles, is unsatisfactory in being a poorly pouring non-homogenous gel. Conversely, milk of magnesia containing 0.2 percent wt./vol. of sodium carboxymethylcellulose but no xanthan gum produces a lowly viscous negatively charged suspension which settles readily and then cakes.

The unique combination of said small quantities of xanthan gum and sodium carboxymethylcellulose in the aqueous magnesium hydroxide suspension of the invention results in a stable and palatable formulation having readily pourable viscosity in use. This unique system is quite pseudoplastic and develops a high viscosity at rest in the bottle, but with little shaking becomes a readily pourable liquid.

Xanthan gum, sold as KELTROL by Kelco Co., is a complex linear polysaccharide gum having a molecular weight of more than one million. This high polymer is linear in structure with β-linked backbone containing D-glucose, D-mannose and D-glucuronic acid with one D-mannose side-chain unit for every eight sugar residues and one D-glucose side-chain residue for every 16 sugar residues. The polysaccharide is partially acetylated and contains pyruvic acid attached to the glucose side-chain residue. The molar ratio of D-glucose to D-mannose to D-glucuronic acid is 2.8:3.0:2.0. Xanthan gum has been approved by the Food and Drug Administration as a stabilizer, emulsifier, thickener, suspending agent, bodying agent, or foam enhancer in food [Federal Register, Vol. 34, No. 53, March 19, 1969]. Xanthan gum is a polysaccharide gum derived from Xanthomonas campestris by a pure-culture fermentation process and purified by recovery with isopropyl alcohol.

The pharmaceutical suspensions of the invention also can include one or more sweetening agents, e.g., saccharin, etc.; one or more flavoring agents, e.g., peppermint, etc.; and, one or more preservatives, e.g., sodium hypochlorite, methyl or propyl 4-hydroxybenzoate, etc. The use of sweetening, flavoring and preserving agents is conventional and forms no part of the instant invention, and it is contemplated that any such agents can be used. or by adding the xanthan gum and sodium carboxymethylcellulose to an aqueous suspension of magnesium hydroxide, and then homogenizing the resulting mixture. The sweetening, flavoring and preserving agents are optionally added at any convenient stage of the preparation. The compositions then are packaged in any suitable container.

The following example will illustrate specific embodiments of the invention without, however, limiting it thereto.

The pharmaceutical suspensions of the invention are conveniently prepared by homogenizing an aqueous suspension containing said quantities of ingredients. This is done by incorporating said xanthan gum and sodium carboxymethylcellulose in an aqueous suspension with magnesium hydroxide, either by incorporating the xanthan gum and sodium carboxymethylcellulose in water and then adding magnesium hydroxide

EXAMPLE

| Ingredient | Percent wt./vol. |
|---|---|
| magnesium hydroxide | 7.77[a] |
| xanthan gum[b] | 0.50 |
| sodium carboxymethylcellulose[c] | 0.20 |
| sweetener[d] | q.s. |
| flavor[d] | q.s. |
| preservative[d] | q.s. |
| water q. s. ad | 100.00 ml. |

[a]Equivalent to 7.40% of wt./wt.
[b]Kelco's KELTROL.
[c]Hercules' CMC 7LF.
[d]Optional.

The above composition is prepared as follows: A slurry of approximately 10 percent wt./wt. of magnesium hydroxide is homogenized (by passage through a colloid mill); the percentage of magnesium hydroxide is ascertained; the other ingredients are added with stirring; the mixture is stirred to obtain a uniform suspension; sufficient water is added if necessary to give the necessary volume (or weight); and, the mixture is homogenized (using a colloid mill) and bottled.

After storage at 25° C. for 1 year, the above composition retained all of its initial desirable properties, that is, improved particle stability, viscosity, homogeneity, suspension stability and palatability, as well as acid neutralizing ability, when compared with commercial milk of magnesia preparations.

Other satisfactory compositions of the invention are prepared using from about 0.1 percent to about 1.0 percent by weight per volume of xanthan gum, from about 0.05 percent to about 0.50 percent of sodium carboxymethylcellulose, and from about 7 percent to about 8.5 percent by weight per weight of magnesium hydroxide.

We claim:

1. An aqueous pharmaceutical suspension comprising water and from about 7 percent to about 8.5 percent by weight per weight of magnesium hydroxide, from about 0.10 percent to about 1.0 percent by weight per volume of xanthan gum and from about 0.05 percent to about 0.50 percent by weight per volume of sodium carboxymethyl-cellulose.

2. The suspension of claim 1 containing from about 0.40 percent to about 0.60 percent by weight per volume of xanthan gum and from about 0.10 percent to about 0.30 percent by weight per volume of sodium carboxymethylcellulose.

3. The suspension of claim 1 containing about 0.5 percent of xanthan gum and about 0.2 percent of sodium carboxymethylcellulose.

* * * * *